(12) United States Patent
Bosze

(10) Patent No.: US 10,155,158 B2
(45) Date of Patent: Dec. 18, 2018

(54) RENDERING METHOD

(71) Applicant: KING.COM LIMITED, St. Julians (MT)

(72) Inventor: Manuel Kurt Bosze, Berline (DE)

(73) Assignee: KING.COM LTD., St. Julians (MT)

( * ) Notice: Subject to any disclaimer, the term of this patent is extended or adjusted under 35 U.S.C. 154(b) by 87 days.

(21) Appl. No.: 15/180,915

(22) Filed: Jun. 13, 2016

(65) Prior Publication Data

US 2017/0354874 A1 Dec. 14, 2017

(51) Int. Cl.
| | |
|---|---|
| *A63F 13/25* | (2014.01) |
| *A63F 13/30* | (2014.01) |
| *A63F 13/60* | (2014.01) |
| *G06T 15/50* | (2011.01) |

(52) U.S. Cl.
CPC .............. *A63F 13/25* (2014.09); *A63F 13/30* (2014.09); *A63F 13/60* (2014.09); *G06T 15/506* (2013.01); *A63F 2300/66* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 2008/0024495 A1 | 1/2008 | Mech et al. | |
| 2008/0064483 A1* | 3/2008 | Sakuma | G07F 17/32 463/20 |
| 2014/0235306 A1* | 8/2014 | Walls | A63F 13/10 463/9 |
| 2014/0342823 A1* | 11/2014 | Kapulkin | A63F 13/355 463/31 |
| 2015/0258444 A1* | 9/2015 | Norden | A63F 13/56 463/31 |
| 2015/0343311 A1* | 12/2015 | Cirlig | A63F 13/537 463/31 |
| 2016/0048286 A1* | 2/2016 | Picon | G06F 3/0488 463/33 |

OTHER PUBLICATIONS

International Search Report, dated Sep. 14, 2017, issued in corresponding International Application No. PCT/EP2017/064438.

* cited by examiner

*Primary Examiner* — Jason Yen
(74) *Attorney, Agent, or Firm* — Saul Ewing Arnstein & Lehr LLP

(57) ABSTRACT

A method of rendering a grid based user interface includes selecting a gaming object with an illumination value to be updated. The gaming objects located directly adjacent to the selected gaming object each having an associated illumination value. The updated illumination value takes into account the illumination values of the directly adjacent gaming objects. The game object is rendered using the updated illumination value.

19 Claims, 13 Drawing Sheets

RENDERING METHOD

FIELD OF EMBODIMENTS

Some embodiments may relate to a method and in particular but not exclusively to a method of rendering an image on a user interface or display for a computer game and computer device therefor.

BACKGROUND OF THE INVENTION

There are many technical challenges and technical considerations facing the designer of computer devices having a user interface in the context of available computer devices and resources, which may be limited. For example, the complexity of a rendering process may make such a computer device run slowly and/or consume too much power.

In the context of a game for example, a technical challenge can involve enabling a game to be fun, accessible and compelling even when there are limited graphics processing resources available, such as when a game is being played on a mobile device such as a smartphone, tablet or other small or portable computer.

Casual computer games having a number of game objects are known. It may be desirable to allow one or more of the game objects to act as a light source. However, the rendering an image where a large number of game objects act as a light source can be complex, for example where the game is being played on a mobile device.

This patent specification describes not only various ideas and functions, but also their creative expression. A portion of the disclosure of this patent document therefore contains material to which a claim for copyright is made and notice is hereby given: Copyright King.com Limited 2016 (pursuant to 17 U.S.C. 401). A claim to copyright protection is made to all screen shots, icons, look and feel and all other protectable expression associated with the games illustrated and described in this patent specification.

The copyright owner has no objection to the facsimile reproduction by anyone of the patent document or the patent disclosure, as it appears in the Patent and Trademark Office patent file or records, but reserves all other copyright rights whatsoever. No express or implied license under any copyright whatsoever is therefore granted.

SUMMARY OF THE INVENTION

According to an aspect, there is provided computer implemented method, said method comprising the following steps performed by one or more processors: selecting an object in an image to be updated, the object to be updated comprising illumination information, said image comprising a plurality of objects; determining for the selected object updated illumination information, the determining being dependent on respective illumination information for a subset of one or more, but not all, other objects to be displayed in the image; and rendering on a display the selected object with the determined updated illumination information.

According to a second aspect, there is provided computer implemented method, said method comprising the following steps: selecting an object in an image to be updated, the object to be updated comprising illumination information, said image comprising a plurality of objects; determining for the selected object updated illumination information, the determining being dependent on respective illumination information for a subset of one or more, but not all, other objects to be displayed in the image; and rendering on a display the selected object with the determined updated illumination information.

One or more of the steps may be performed in hardware. For example, a hardware renderer may perform the rendering. Alternatively or additionally, one or more steps may be performed by a processor.

It should be appreciated any one of the following features maybe used in combination with the first aspect or the second aspect.

The selected object and at least some of the other objects in the image may be arranged in a grid like arrangement.

The subset may comprise only directly adjacent objects to the selected object.

The method may comprise determining which of the other objects are directly adjacent to the selected object.

The method may comprise storing in a memory, the updated illumination information for the selected object.

The method may comprise reading from a memory illumination information of the directly adjacent objects.

The method may comprise storing in a memory illumination information of a plurality of the objects of the image as a texture.

The illumination information of a respective object may be stored as a pixel in the texture, and a location of the pixel in the texture may be dependent on a location of the respective object in the image.

Illumination information of a plurality of objects may be stored in a single texture.

Illumination information of a plurality of objects may be stored in a single pixel, each object being stored in a color channel.

The method may comprise storing illumination information of a respective object in a bit field, wherein each bit in the bit field corresponds to a respective object.

The position of a corresponding bit in the bit field may correspond to a predetermined location of the respective object in the image.

The method may comprise storing illumination information of a respective object in a bit field, wherein each object is associated with a plurality of bits in the bit field.

The method may comprise using at least one pre-rendered texture stored in a memory to display one or more objects respectively associated with at least one pre-rendered texture.

The method may comprise displaying a respective pre-rendered texture if illumination information of a respective object corresponds to illumination information associated with the pre-rendered texture.

According to another aspect, there is provided a computer implemented device comprising a display and at least one processor configured to: select an object in a graphical image to be updated, the object to be updated comprising illumination information, said graphical image comprising a plurality of objects; determine for the selected object updated illumination information, the determining being dependent on respective illumination information for a subset of one or more, but not all, other objects to be displayed in the image; and render on the display the selected object with the determined updated illumination information.

The selected object and at least some of the other objects in the image may be arranged in a grid like arrangement.

The subset may comprise only directly adjacent objects to the selected object.

The at least one processor may be configured to determine which of the other objects are directly adjacent to the selected object.

The device may comprise a memory configured to store the updated illumination information for the selected object.

The at least one processor may be configured to read from a memory illumination information of the directly adjacent objects.

The at least one processor may be configured to store in a memory illumination information of a plurality of the objects of the image as a texture.

The illumination information of a respective object may be stored as a pixel in the texture, and a location of the pixel in the texture may be dependent on a location of the respective object in the image.

Illumination information of a plurality of objects may be stored in a single texture.

Illumination information of a plurality of objects may be stored in a single pixel, each object being stored in a color channel.

The at least one processor may be configured to store illumination information of a respective object in a bit field, wherein each bit in the bit field corresponds to a respective object.

The position of a corresponding bit in the bit field may correspond to a predetermined location of the respective object in the image.

The at least one processor may be configured to store illumination information of a respective object in a bit field, wherein each object is associated with a plurality of bits in the bit field.

The at least one processor may be configured to use at least one pre-rendered texture stored in a memory to cause one or more objects respectively associated with at least one pre-rendered texture to be displayed on said display.

The at least one processor may be configured to cause a respective pre-rendered texture to be displayed on said display if illumination information of a respective object corresponds to illumination information associated with the pre-rendered texture.

According to another aspect, there is provided a non-transitory computer readable storage device for storing instructions that, when executed by at least one processor, causes said at least one processor to: select an object in an image to be updated, the object to be updated comprising illumination information, said image comprising a plurality of objects; determine for the selected object updated illumination information, the determining being dependent on respective illumination information for a subset of one or more, but not all, other objects to be displayed in the image; and render on a display the selected object with the determined updated illumination information.

A computer program comprising program code means adapted to perform the method(s) may also be provided. The computer program may be stored and/or otherwise embodied by means of a carrier medium.

A further aspect provides computer program products for implementing the afore-defined methods.

In the above, many different embodiments have been described. It should be appreciated that further embodiments may be provided by the combination of any two or more of the embodiments described above.

Various other aspects and further embodiments are also described in the following detailed description and in the attached claims

BRIEF DESCRIPTION OF THE DRAWINGS

To understand some embodiments, reference will now be made by way of example only to the accompanying drawings, in which.

DETAILED DESCRIPTION

The terms user and player are used interchangeably throughout this document and no specific meaning is intended using one or the other unless the context suggests otherwise. A person skilled in the art will realize that the different approaches to implementing the game are not exhaustive, what is described herein are certain preferred embodiments. It is possible to implement the invention in a number of variations without departing from its spirit or scope.

Although some embodiments are described with respect to of the display of game objects in a game, it will be understood that the invention is not limited as such. Some embodiments may be used for the display of any non-game object. Thus, embodiments are not limited to the field of computer implemented games.

Figure 1:
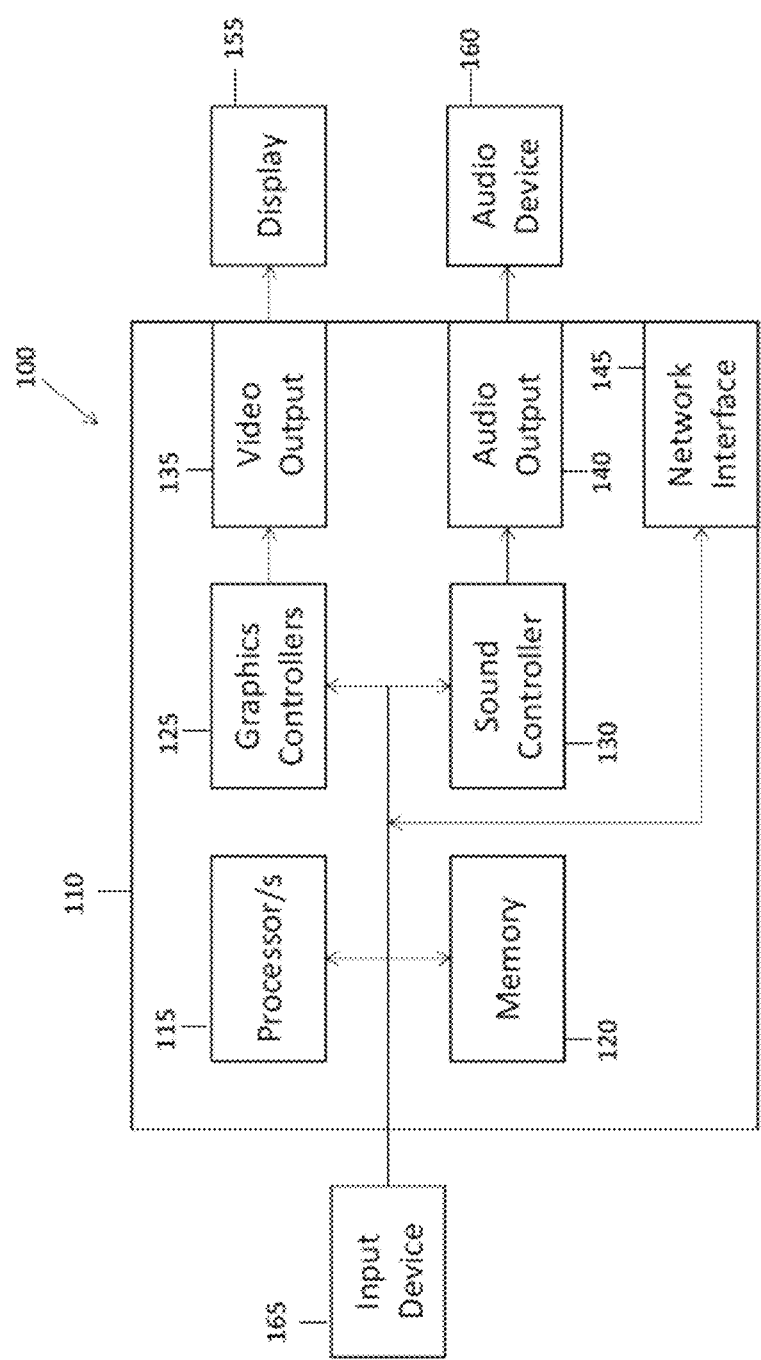
FIG. 1 shows a schematic view of a user device in which some embodiments may be provided.

A schematic view of a user device 100 according to an embodiment is shown in FIG. 1. All of the blocks shown are implemented by suitable circuitry. The blocks may be implemented in hardware and/or software. The user device may be for example, a mobile device. The user device may have a control part 110. The control part 110 has one or more processors 115 and one or more memories 120. The control part 110 is also shown as having a graphics controller 125 and a sound controller 130. It should be appreciated that either or both of the graphics controller 125 and sound controller 130 may be provided by the one or more processors 115.

The graphics controller 125 is configured to provide a video output 135. The sound controller 130 is configured to provide an audio output 140. The controller 110 has an interface 145. The interface 145 may enable the device to communicate with a network such as the Internet or other communication infrastructure.

The video output 135 is provided to a display 155. The audio output 140 is provided to an audio device 160 such as a speaker and/or earphone(s).

The device 100 has an input device 165. The input device 165 can take any suitable format and can be one or more of a keyboard, mouse, touch screen, joystick or game controller. It should be appreciated that the display 155 may in some embodiments also provide the input device 165 by way of an integrated touch screen for example.

The blocks of the controller 110 are configured to communicate with each other by an interconnect such as a bus or any other suitable interconnect and/or by point-to-point communication.

It should be appreciated that in some embodiments, the controller 110 may be implemented by one or more integrated circuits, at least in part.

The user device 100 is shown by way of example only. In alternative embodiments, one or more of the parts may be omitted. Alternatively or additionally, some embodiments may comprise one or more other parts. Alternatively or additionally, one or more parts may be combined.

Figure 2:
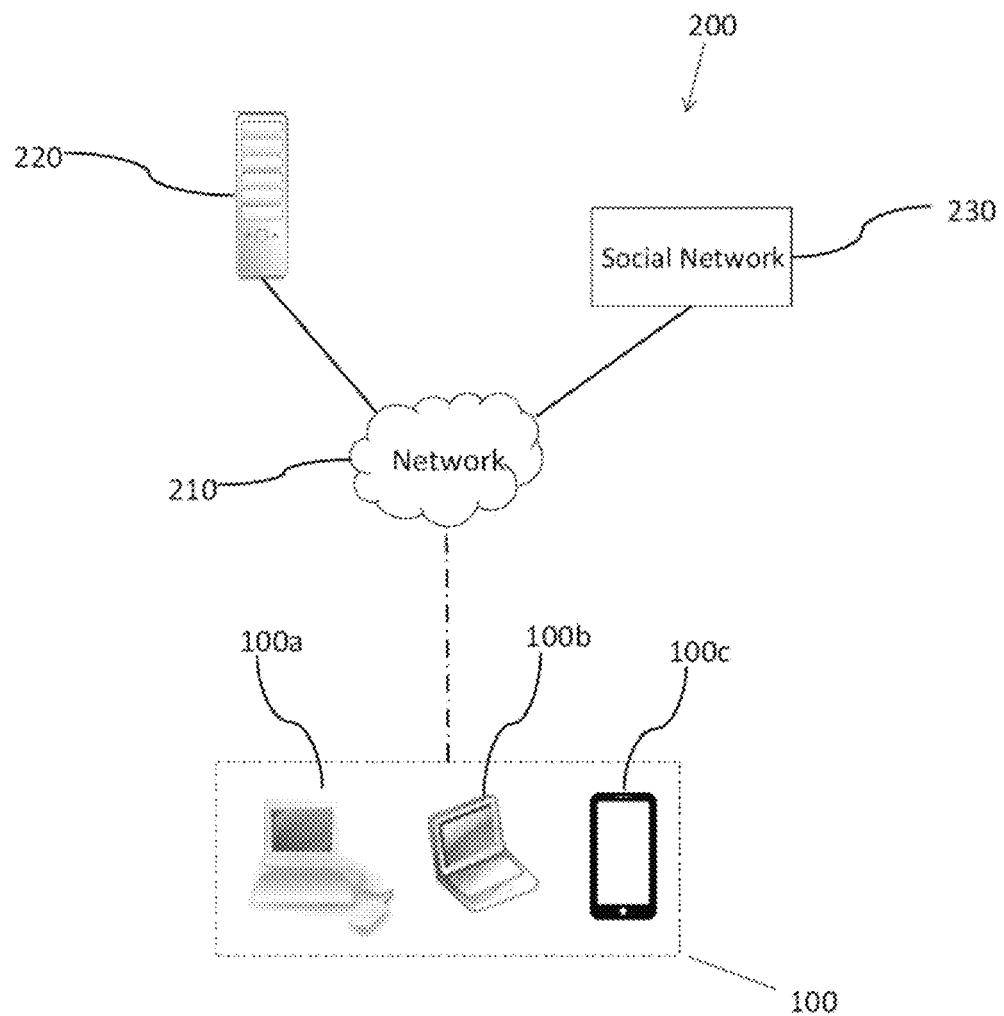
FIG. 2 shows a schematic view of a system in which some embodiments may be provided.

FIG. 2 schematically shows a system 200 in some embodiments. The system 200 comprises a server 220, which may store databases of game player's details, profiles, statistics, etc. In practice, one or more databases may be provided. Where more than one server is provided, the database(s) may be provided in one database or across two or more servers. The server may also have a games data function. This may comprise one or more units of memory to store the computer game program and user behaviour data, and a processor to run the games program and process the user behaviour data.

The server 220 may communicate via for instance the internet 210 to one or more user devices 100, shown in the Figure by way of example as user devices 100a, 100b and 100c, and may further provide connections to a social network 230 such as Facebook™.

It should be appreciated that embodiments may be deployed in different system architectures. For example, the computer game may be implemented as a computer game that is stored in the memory 120 of the user device 100 and is run on the processor 115 of the user device 100. However, the server 220 may handle some elements of the game in some embodiments. By way of example only, a Java game applet may be provided to the user device 100 and the locally running Java applet will generate, for example, the graphics, sounds, and user interaction for the game play on the user device 100. Some data may be fed back to the server 220 to allow interaction with other players. The data, which is fed back, may also allow scoring and/or cross platform synchronization.

In some embodiments, the game may be implemented as a computer program that is stored in a memory of the system, for example, the server 220, and which runs on a processor of the game server. Data streams or updates are supplied to the user device 100 to allow the user device 100 to render and display graphics and sounds in a browser of the user device 100. Such an approach is sometimes referred to as a web services approach. It should be appreciated, however, that such an approach does not necessarily require the use of the Internet.

Figure 3:
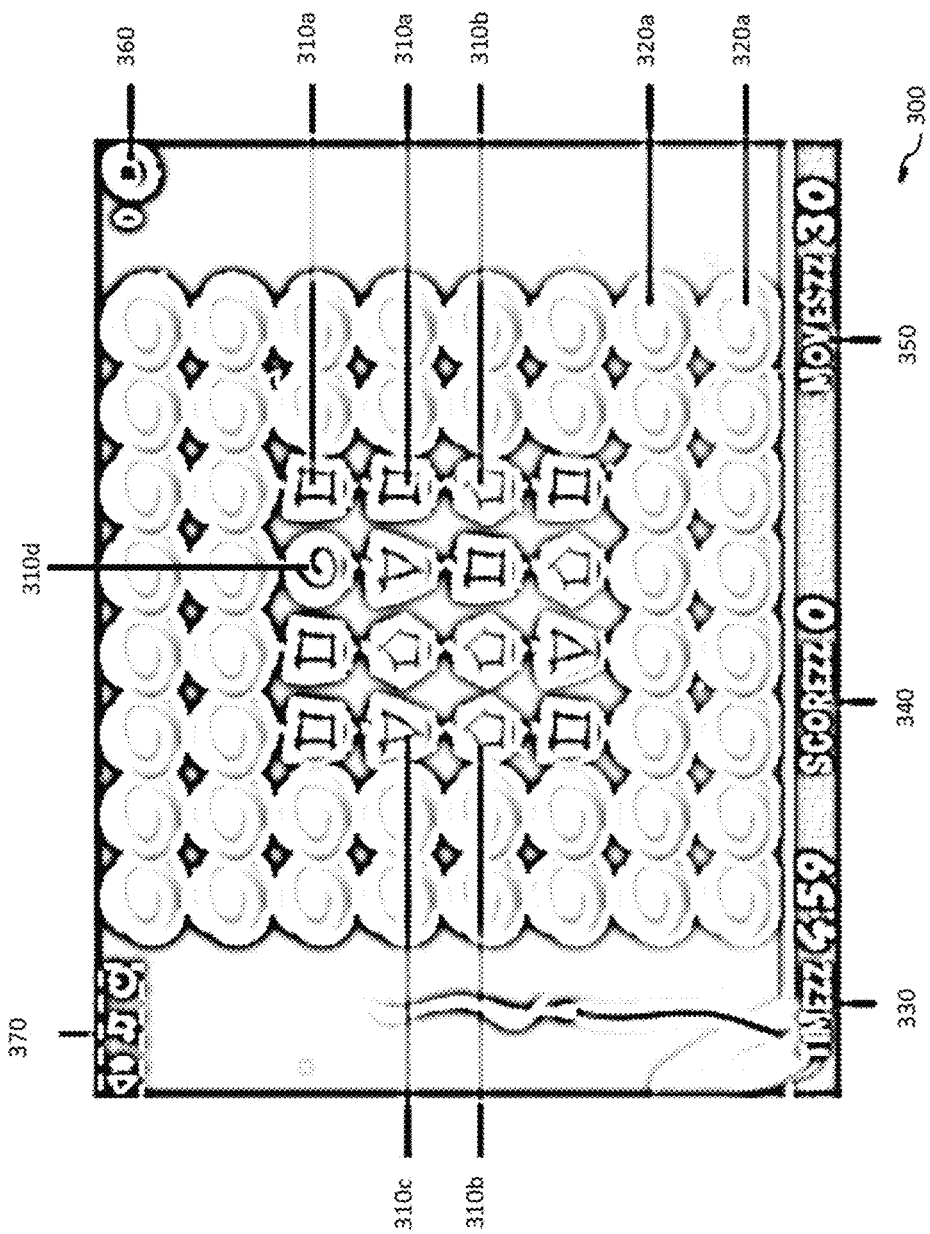
FIG. 3 illustrates an example of a displayed game board upon which are disposed game objects.

An embodiment will now be described. FIG. 3 illustrates an example displayed game area or game board 300. The game has a game board 300 upon which are disposed game objects, which may be comprised of first game objects 310a, 310b, 310c, 310d and second game objects 320a. The game objects may be disposed on the game board in grid. That is to say game objects may be arranged in a table with rows and columns on the game board. First game objects 310a, 310b, 310c may have varying characteristics. The characteristics shared by the first and second game objects may be one or more of color, shape, and/or different types of objects. In this embodiment, the first game objects are differently colored and shaped lanterns as shown in FIG. 3. Information of the game objects and/or information of characteristics associated with the game objects may be stored in a memory of a device upon which the game is being played, and/or in a game server communicating with the device. There may also be provided a player selection indicator (not shown in the Figure) which may be a representation of a pointer or hand in some embodiments, and may or may not be displayed to a user in some embodiments utilizing intuitive touchscreen or gesture recognition hardware. Of importance is that a selection mechanism is available for selecting a plurality of game objects, for example "clicking" and/or "switching", or for example a "touch and/or move" or slide mechanism for repositioning displayed first game objects 310a, 310b, 310c. The exact mechanism may be according to the computing or user device resources provided as described in FIGS. 1 and 2.

The game board 300 of FIG. 3 also shows, in this embodiment, an area comprising game information in the form of time elapsed 330, current score 340 and the number of remaining moves 350 available to the user. In addition, basic user device controls 370 may be displayed as shown, and special or valuable objects 360 may be counted and displayed, depending on the rules of the computer implemented game.

First game objects 310a, 310b, 310c, 310d may be removed from the game board 300 by selecting neighboring game objects 310b that share at least one same characteristic (e.g. color, and/or type of object graphically represented) of the one or more characteristics. New first game objects may then be generated and displayed in the positions on the game board 300 vacated by those game objects 310b that have been removed or eliminated by the selections. The game objects 310a, 310c replacing those eliminated or removed game objects, may be displayed on the game board 300 and may subsequently cascade position by position in a vertical direction with respect to the game board to occupy those positions made available by the elimination of the first or second game objects.

Figure 4:
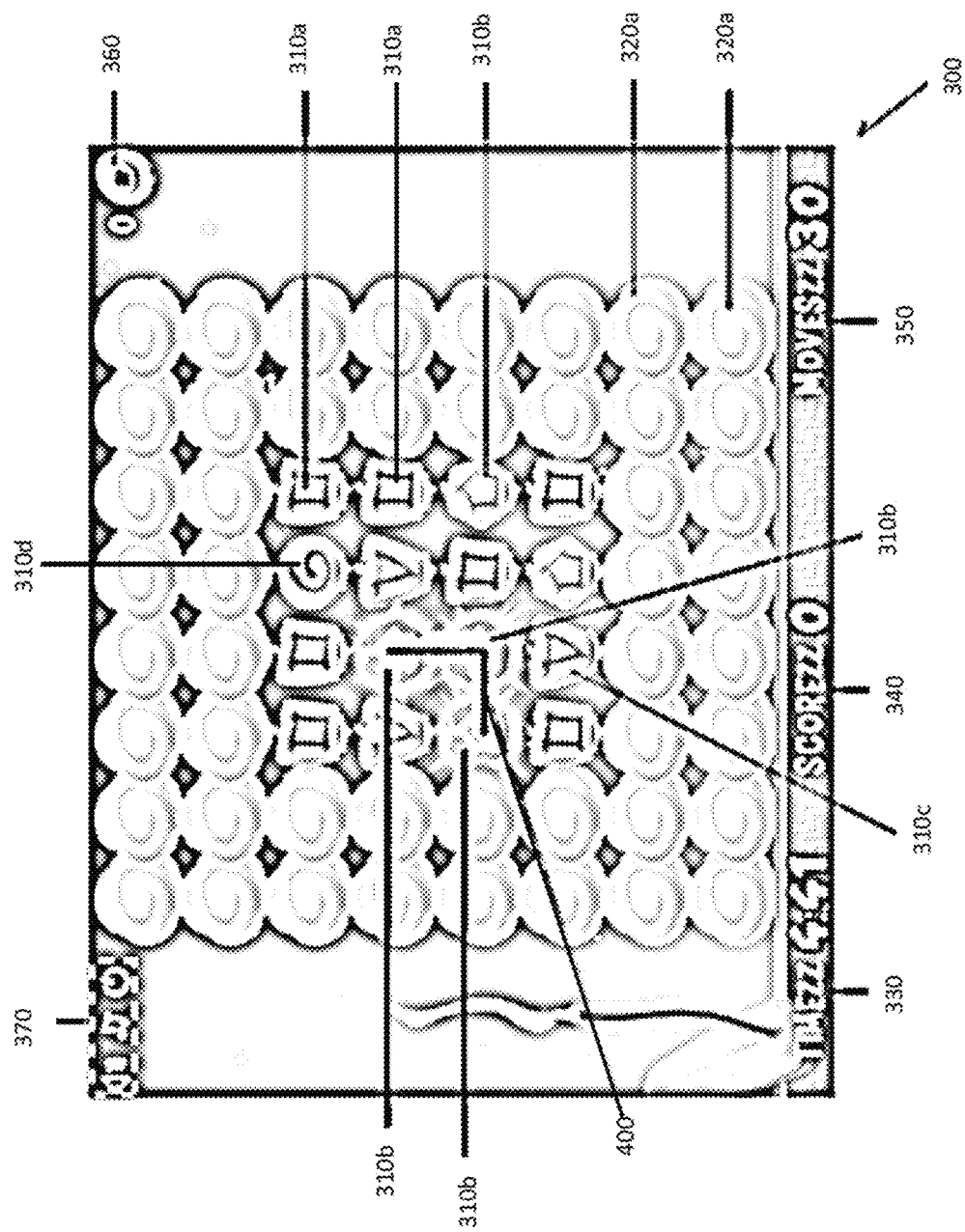
FIG. 4 shows a user selection of three neighboring first game objects on the game board of FIG. 3.

FIG. 4 illustrates such a mechanic in more detail. FIG. 4 shows a user selection of three neighboring first game objects 310b sharing at least one same characteristic to remove or eliminate the three game objects 310b from the game board 300. The shared one or more characteristics of the three game objects 310b may in some embodiments be the color of the first game objects 310b selected from for example a palette of four or more color characteristics. In an embodiment, the four or more colors are for example red, green, blue and yellow.

The game board 300 illustrates the touch or select input track 400 input by the user to highlight and select the group of three first game objects 310b.

Figure 5:
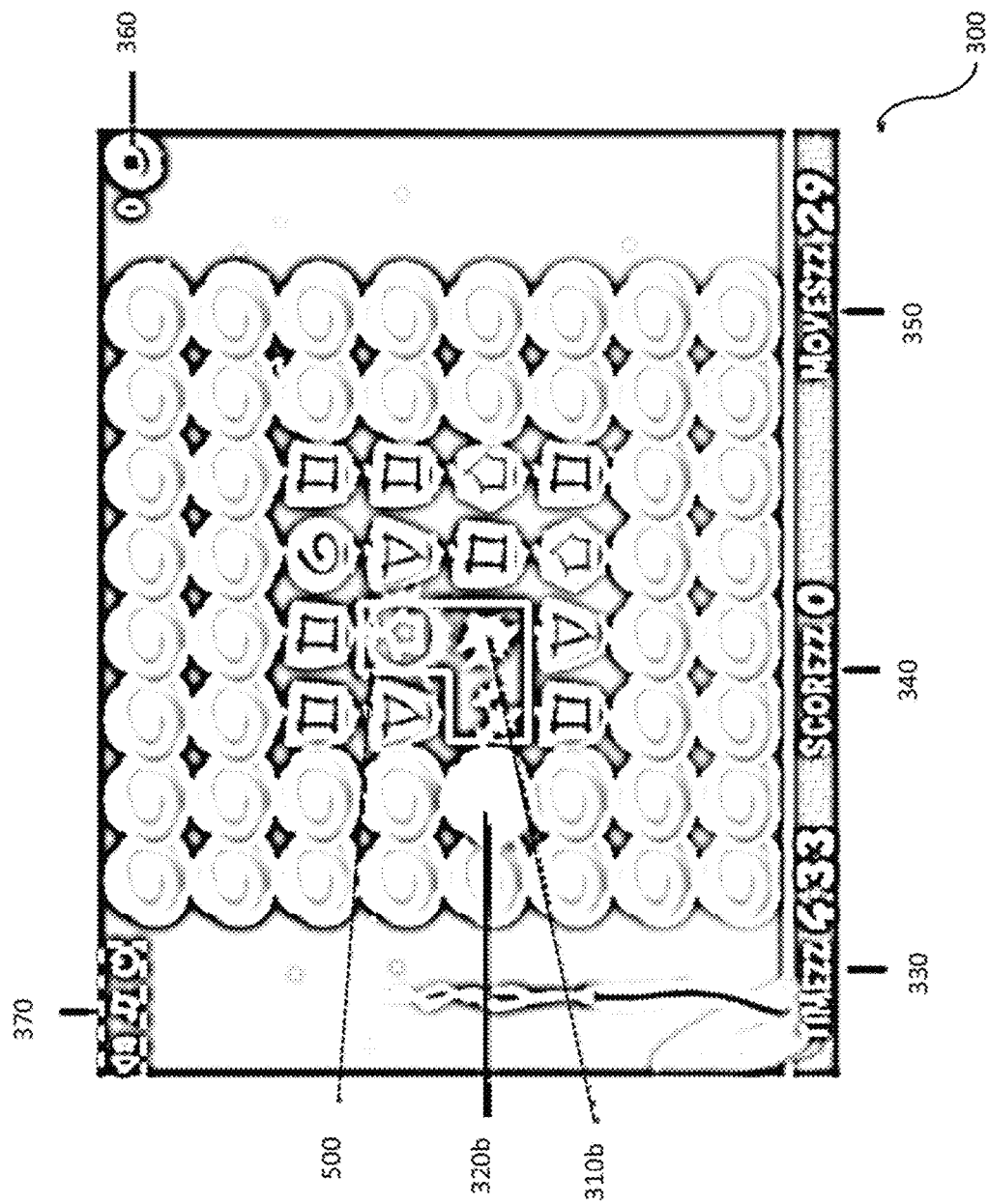
FIG. 5 shows the game board immediately after the selection of the group of three neighboring first game objects, each having at least one same characteristic.

FIG. 5 shows the game board 300 of FIG. 3 immediately after the selection of the group of three neighboring first game objects 310b having at least one same characteristic. The successful selection of matching neighboring first game objects 310b results in the removal, in some embodiments of the selected first game objects 310b, and also causes a state change in a neighboring second game object 320a to for example a different display state in accordance with a stored third characteristic. In an embodiment, the third characteristic may mandate different display colors of the second game object for each of the first 320a and second state 320b. FIG. 5 shows the neighboring second game object 420b transformed into its second state.

In some embodiments, the second game objects are first transformed from a first state to a second state when activated, and subsequently only removed to for example reveal a first game object 310a when both first and second state have been activated. Hence, a second game object with a two-step or three-step characteristic for elimination is provided, thereby bringing an extra challenge and elements of strategic gameplay into the consideration of the user.

From the foregoing, it will therefore be understood that a user can interact with a game board of a game to achieve one or more game objectives. This may be by way of a touch input interacting with a touch screen of a user device. In order for the user device and/or game to determine where a user has touched the touch screen, and consequently for a determination to be made as to which game object a user has selected or is trying to select, a touch detection or collision detection algorithm is provided.

Figure 6:
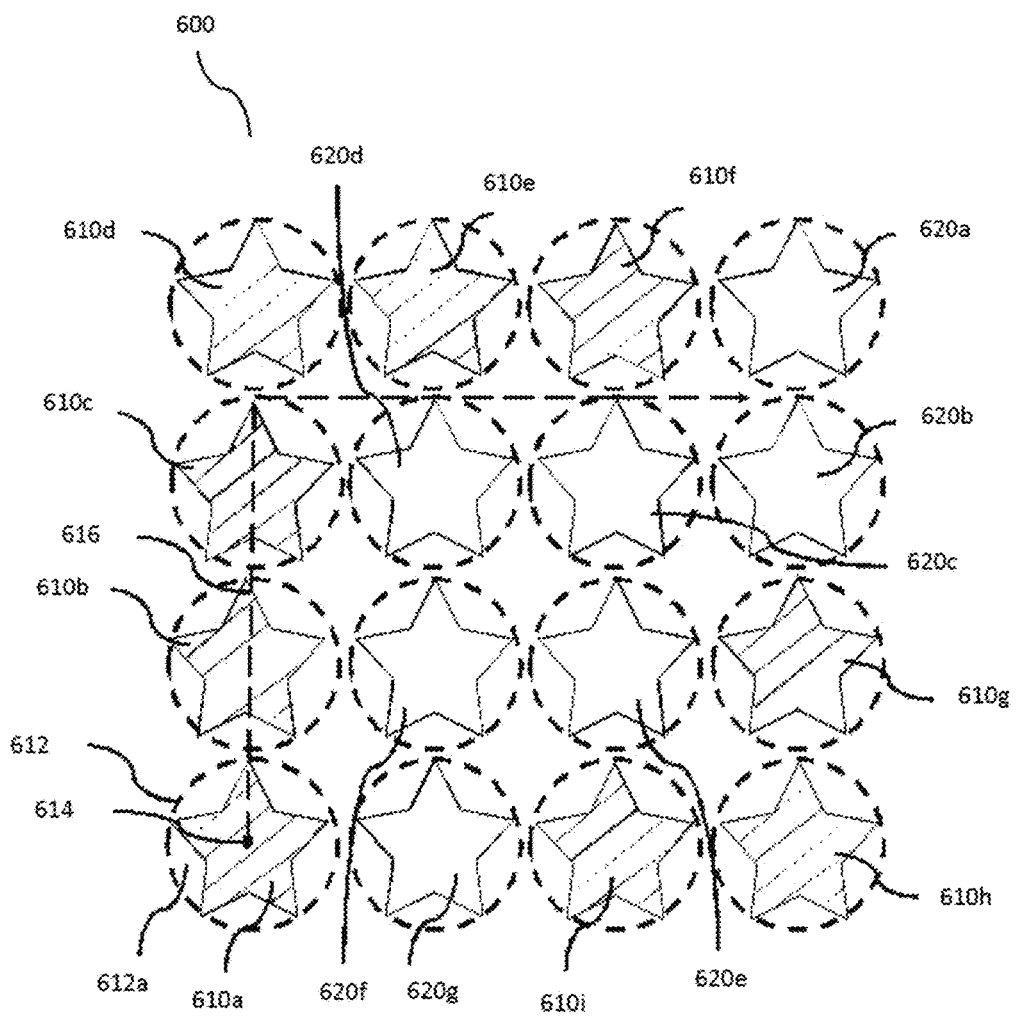
FIG. 6 shows a portion of a game board of a game which uses similar principles to the game described in relation to FIGS. 3 to 5 but instead the game objects are visually represented as stars.

By way of example, FIG. 6 shows a portion of a game board 600 which uses similar principles to the game described in relation to FIGS. 3 to 5 but instead the game objects are visually represented as stars. The game board comprises first game object 620a to 620g, and second game objects 610a to 610i. In this example, the first game objects are stars displayed without hatching, and the second game objects are stars with hatching. It will of course be understood that this is by way of example only, and that the first and second objects could differ in any way e.g. color, shape, and/or different types of objects. It may be understood that the game board may have only a first type of game object on the game board 600. There may also be third, fourth and indeed any number of different types of object on the game board 600.

Each game object is contained within a selection (or collision) area. In the example of FIG. 6 the selection areas comprise circles, for example circle 612 which bounds object 610a. It will be understood that the use of circles is by way of example only, and that in other embodiments the selection areas may comprise squares, rectangles, or indeed any other shaped polygon. The size of one or more of the collision areas may also be configurable. This may be configured for example by a game designer. If a user touches a point on the game board within a given selection area, then it is considered that a user has selected a game object that is contained within or associated with that selection area. This is the case even if the user has selected a point that it outside the object itself, but within the selection area. For example, if a user selects a point 612a within circle 612, then it will be determined that the user has selected game object 610a, even though the contact point is outside of that object.

A user can select a series of objects in-turn in order to attempt to meet a game objective. For example, a user may attempt to link a series of objects of the same type and/or sharing one or more characteristics. An example user input path is shown by the dashed line 616 in FIG. 6. Initially a user touches object 610a at point 614, and then the user's contact with the game board 600 follows a path as shown by dashed line 616.

It will be understood that the dashed lines (e.g. circles) in FIG. 6 are for the purposes of explanation only, and that in practice the boundaries defining the selection areas are not visible to a user.

Figure 7:
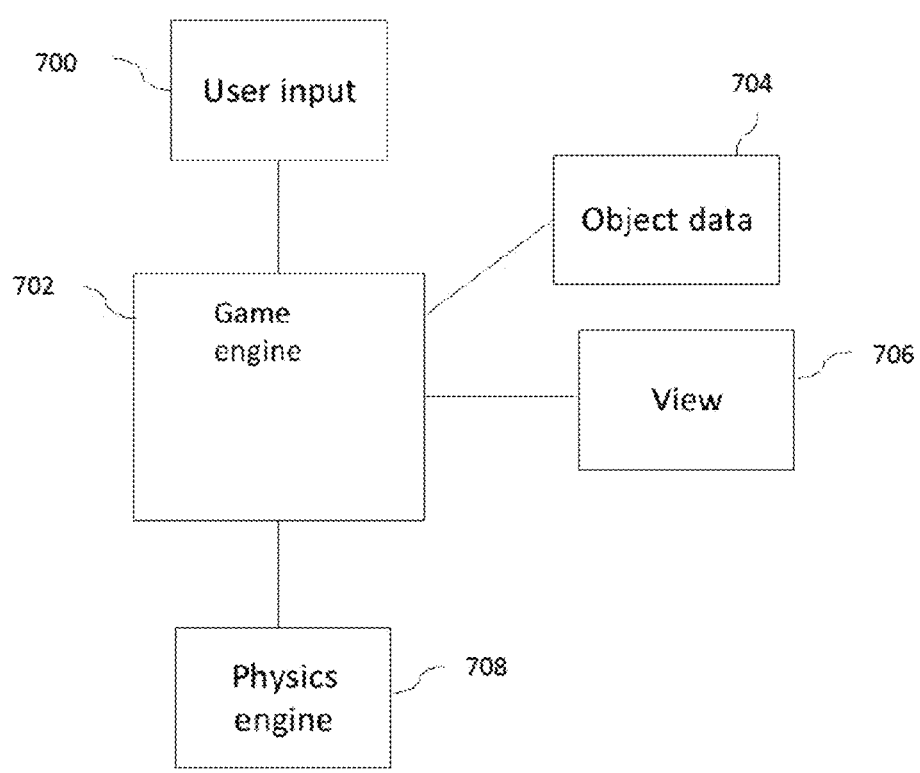
FIG. 7 schematically shows the functional blocks in a user device, which may enable game play.

Reference is made to FIG. 7, which schematically shows the functional blocks of an embodiment, which may enable game play. A user input block 700 is shown. This captures the user input and feeds the input to a game engine 702. In the context of the game of some embodiments, this user input may be which game objects are selected or linked by a user. This user input can be via any suitable user interface, such as discussed earlier.

The game engine 702 will process the information provided by the user input. The game engine 702 (for example a game model) will determine if a valid combination has been made.

Each game object has object data associated therewith. The object data 704 may be stored in any suitable memory location. In some embodiments, the object data may be considered to be part of the game engine and in other embodiments may be considered to be outside the game engine. The object data may provide information as to the properties of a game object. These properties may include, for example, one or more attributes such as, color, shape, size, or special functions. Special functions may include, for example, features that aid a user in: completing the game; unlocking desirable game content; or obtaining more points. The data may include the position data, that is, information representing the position of the game object in the displayed image. Furthermore, information may be provided as to whether or not the object is an illuminable object. For example, a specific illumination value, such as a 0 value, may indicate that the object cannot be illuminated. The information may alternatively or additionally indicate if the object is a light source.

In some embodiments, the game engine will check if the game object satisfies the rule or rules for a valid match. The rule or rules define whether a match condition has been satisfied. The match condition will be dependent on the game. In some embodiments, a match condition will be satisfied if the game objects are arranged to provide a sequence of at least three adjacent game objects sharing at least one same characteristic. In some embodiments, the game objects of the sequence are removed.

Thus, the game engine will be in control of the matching mechanism. The game engine will have access to data for each game object including its position and the at least one characteristic associated with the game object and will be able to determine if a match condition has been met. If a match condition is met, the game objects in the match may be removed.

It should be appreciated that in other embodiments, the game may use any type of match mechanic such as switching, sliding or linking. The game objects may be any suitable game object.

A physics engine 708 is provided which is configured to control the movement of moving game objects on the display. This may be used in some embodiments to simulate the effect of gravity.

The physics engine 708 may be part of the game engine 702.

A view function 706 uses of the object data to provide the displayed image with which the user is able to view and/or interact.

Some embodiments will now be described in the context of a computer-implemented game. Some embodiments may be used when displaying game objects. A game object may comprise any element of the game, such a game element to be matched with other game elements, a character, a prop, scenery. Some games may have more than one different type of game objects.

Some embodiments may be used a computer implemented game, where one or more game objects glow or are illuminated in response to the illumination effects of one or more other game objects located nearby.

Although some embodiments are described with respect to the illumination state of game objects in a game, other embodiments may be used where the state of a game object has an influence on the visual appearance of one or more other game objects. The illumination state of a game object may represent an illumination value of the object.

The illumination of a game object may be effected through the manipulation of one or more aspects of its appearance, for example: color, brightness, shadow, glow, or shading. This may comprise altering one or more of the aforementioned properties alternatively or additionally in only a portion of the game object or in a portion of time to generate effects, for example glimmering, flashing, flickering, sparkling, and/or twinkling.

The complexity and performance of mobile processing units in portable hardware has developed substantially in recent years. Modern graphics controllers in mobile devices may offer a large degree of control over the aesthetics of an object. The appearance of a game object may be calculated dynamically. This dynamic calculation may be used to achieve higher graphical fidelity than can be achieved by showing a static image on a display.

For example, it is possible to achieve dynamically lit game objects in 2D (two-dimensional)-based games using techniques such as per-pixel lighting and normal mapping. Per-pixel lighting is a technique that, given an illumination value and an image, renders an illuminated image by calculating the relevant color values for each pixel of the image.

Normal mapping, otherwise known as bump mapping, may be used to describe one or more additional dimensions. A normal map for an image with dimensions X and Y, may describe the Z direction.

However, this enhanced graphical fidelity may come at the expense of increased computational complexity. The fastest mobile processing units may be able to handle the increased computing requirements, but such requirements may result in a poor experience for users with less powerful devices or where the available resources are limited.

In order to take advantage of the increasing performance offered in mobile devices, software is used to aid in the development of computer games, this software is known as a game engine. One feature of a game engine is to enable the rendering of 3D (three-dimensional) objects by breaking them down into smaller 2D polygons. Polygons may be for example, any 2D shape, such as a four-sided face, also known as a quad. The resultant smaller polygons, or quads, may have a texture applied via a texture mapping process. A texture may be 2D image, pattern or color. Texture mapping is a method of adding detail, for example, an image, color, or pattern, to the surface of a shape or polygon. That is to say, texture mapping may be considered analogous to applying patterned paper to a plain white box, wherein the white box is the shape and the patterned paper is the texture. Once a texture has been applied, smaller polygons may be reconstructed back into a single object and then a snapshot from a single angle may be displayed or saved. This snapshot may be known as a camera view. A camera view, such as an orthographic camera makes the engine behave in a similar manner to a 2D engine, along with the associated computational complexity benefits, whilst displaying an image with a 3D appearance.

Textures can be rendered onto polygons, or quads, via a shader pipeline. A shader pipeline is used to create a 2D representation of a 3D shape or scene. A shader pipeline receives instructions from a shader. A shader is computer program that is executed to calculate the appropriate color to be displayed for a given game object. A shader may calculate the exact color to be displayed at a given position of a game object, for example, on a per-pixel basis (pixel or fragment shader) or per-polygon basis (vertex shader). The color of a polygon or pixel may be dependent on one or more of: the applied texture; user interaction; shading effects; lighting effects; fog effects; and shadow effects. The performance of a shader may be defined by the time it takes to calculate color values for a scene or game object. The performance of the shader may be affected by one or more factors, for example, the number of times textures are read into the shader, the number and complexity of effects that are applied to the textures and code branching. Code branching, in this example, may refer to the number of different outcomes (branches) of conditional statements (e.g. if, else, and for each) the shader must evaluate to determine the color of a pixel or polygon.

Modern graphics controllers in mobile devices may provide a large degree of control over the aesthetics of an object. The color of the pixel that is determined by the fragment shader can be calculated dynamically. This dynamic calculation may be used to achieve higher graphical fidelity than just drawing textures on a display. For example, it is possible to achieve dynamic lighting situations in 2D-based games using techniques such as per-pixel lighting and/or normal mapping. Calculating lighting information for each pixel may be taxing. Each light calculation increases the computational complexity and thus increases the demand on the graphics-processing unit.

A typical 2D game object has no inherent information as to how light affects it, as a 2D texture does not have any information about its three dimensional shape. For the light calculation algorithm, the object appears flat. This issue may be addressed by attaching a normal-map to the shader of a game object. For each pixel of color stored in the color texture, there is a corresponding pixel in an additional texture, storing the surface normal, which provides 3D information about the form of the object. This additional information may allow realistic 3D lighting effects to be applied to the 2D object.

However, with large or high-resolution user interfaces, calculating realistic lighting effects can become very demanding for mobile processing units. Realistic lighting effect calculations are especially demanding when a game object can both illuminate other gaming objects and receive illumination information from surrounding game objects. For example, given a game board with 63 game objects arranged in a 7×9 grid, if all 63 game objects may be illuminated, it would result in the illumination state of 63 game objects needing to be calculated in each frame for each pixel, based upon 62 surrounding game objects. Furthermore, calculating the illumination effect of 63 game objects in each frame for each pixel may be necessary if the current illumination state of a pixel contributes to its new value. The computational complexity of the game per game object would increase as the number of illuminated game objects increased, which may be detrimental to the performance of the game. The performance of the game may refer to the frame rate, response rate or audio-visual synchronization. However, other measures of performance may alternatively or additionally be impacted.

Illumination effects are calculated in the fragment shader, for each pixel calculated in the previous example, the illumination information of 63 game objects is passed to the shader. All of the possible lights on the board are included for each pixel of the game object rendered. Even if some of the lights to be rendered are ignored, performance may still be impaired if the processor cannot anticipate, in advance, which game objects will or will not be included in the calculation.

Figure 8:
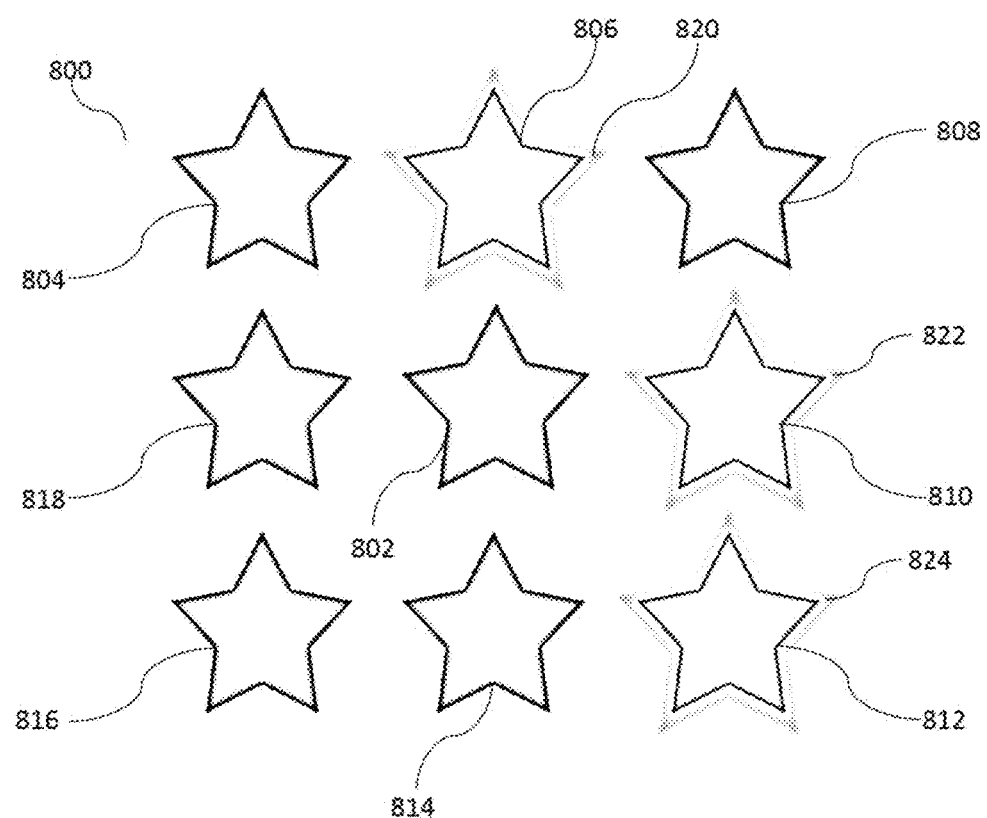
FIG. 8 shows a part of a game board according to an embodiment, the game may be, for example, as previously described in relation to FIG. 6.

A game board 800 according to an embodiment is shown in FIG. 8. The game may be for example as previously described in relation to FIG. 6. The game board 800 may comprise any number of game objects, for example more than 2, more than 5, more than 10, more than 26 or more than 100. The game board 800 of FIG. 8 comprises 9 game objects 802, 804, 806, 808, 810, 812, 814, 816, 818, which are presented in a 3×3 grid. In order to enhance gameplay any game object may act as a source of illumination. An illuminated game object 806, 810, 812 may be represented by using a shading effect 820, 822, 824 at the edges of the illuminated game object.

Figure 9:
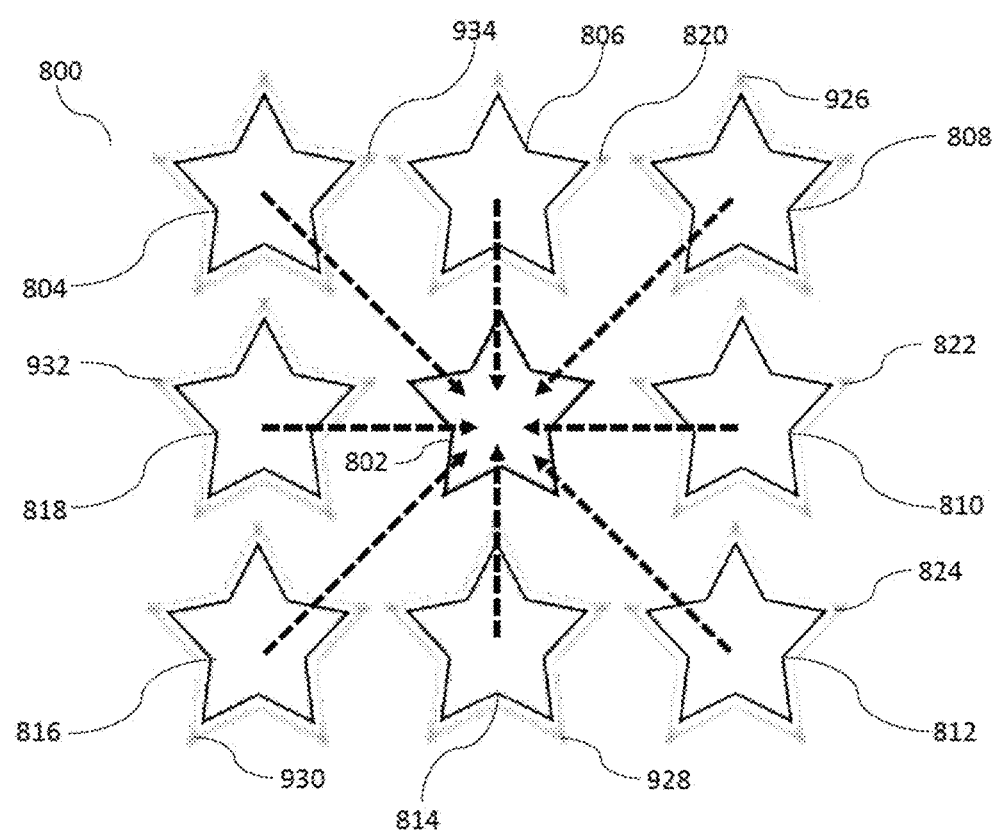
FIG. 9 shows schematically the determination of the illumination of a center game object from the game objects directly adjacent to the center object.

FIG. 9 shows schematically the determination of the illumination the center game object 802 of the 9 game objects 802, 804, 806, 808, 810, 812, 814, 816, 818 of a game board where there are more than 9 game objects. The computational complexity of calculating the illumination of the given game object 802 is reduced by only considering the contribution, to the illumination effect, of the eight illuminable game objects directly adjacent 804, 806, 808, 810, 812, 814, 816, 818, to the game object to be stored 802.

It may be understood that for a larger game board, illumination information may be encoded for the entire game board by systematically storing information relating to the illumination state of the directly adjacent game objects, for each game object.

A game object directly adjacent to the game object to be stored 802, more specifically refers to any game object that has a shared face, edge, or corner with the object to be stored. It may be apparent that directly adjacent includes game objects that are: diagonally adjacent; 804, 808, 812, and 816; horizontally adjacent, 818, and 810; and vertically adjacent 806, and 814.

It may be understood that a game object at the edge of the game board, has fewer directly adjacent game objects from which to consider a contribution to the illumination effect. For example, the illuminable game objects contributing to the illumination effect of game object 808 may be objects 806, 802, and 810. By way of further example, the illuminable game objects contributing to the illumination effect of game object 818 may be objects 804, 806, 802, 814, and 816. However, different rules may be used in different embodiments for determining which game objects are considered directly adjacent.

Other embodiments may use different rules to select the subset of game objects which are to be used to determine the illumination of a particular game object. In some embodiments, it is possible that one or more of the subset of game objects is not directly adjacent.

In some embodiments, the degree of illumination provided by an object may be taken into account when selecting a subset of objects. It should be appreciated that the subset of objects will not contain all the objects. In the case of relatively large game boards with a relatively large number of game objects, the subset may be significantly smaller than the total number of game objects.

In some embodiments, it may be desirable or perhaps necessary to calculate or determine the illumination effects in real time.

Circumventing a distance calculation by utilizing only a subset of game objects and for example, the game objects directly adjacent to the game object being considered may result in a reduction of computational complexity. In this example all of the gaming objects contributing to the calculation show a shading effect 820, 822, 824, 926, 928, 930, 932, 934. Arrows exemplify the contribution of the illuminated game objects to the given game object for which the calculation is being performed.

Considering only the game objects that are located directly adjacent to the game object, may allow illumination effects to be rendered relatively simply. Thus, a real time calculation may be achievable even on comparably slow graphics processing units. The game objects directly adjacent to the current game object are known. As such, it is possible in some embodiments to provide an element of pre-calculation to alleviate the real time processing demand.

If a game object comprised, for example, 20×30 pixels, a fragment shader would be invoked 600 times for that game object, each time with a set of parameters. The parameters may comprise a texture, an interpolated position and a set of texture coordinates indicating an area to be read from that texture In some embodiments, the illumination state of the game objects may be encoded into a texture comprising a plurality of pixels. The illumination state of the game objects may be encoded into a texture of the same number of pixels as there are game objects, or illuminable game objects, on the game board. This may allow an efficiency in the transferring of the illumination state of the game objects from the vertex shader into the fragment shader to be achieved.

Figure 10:
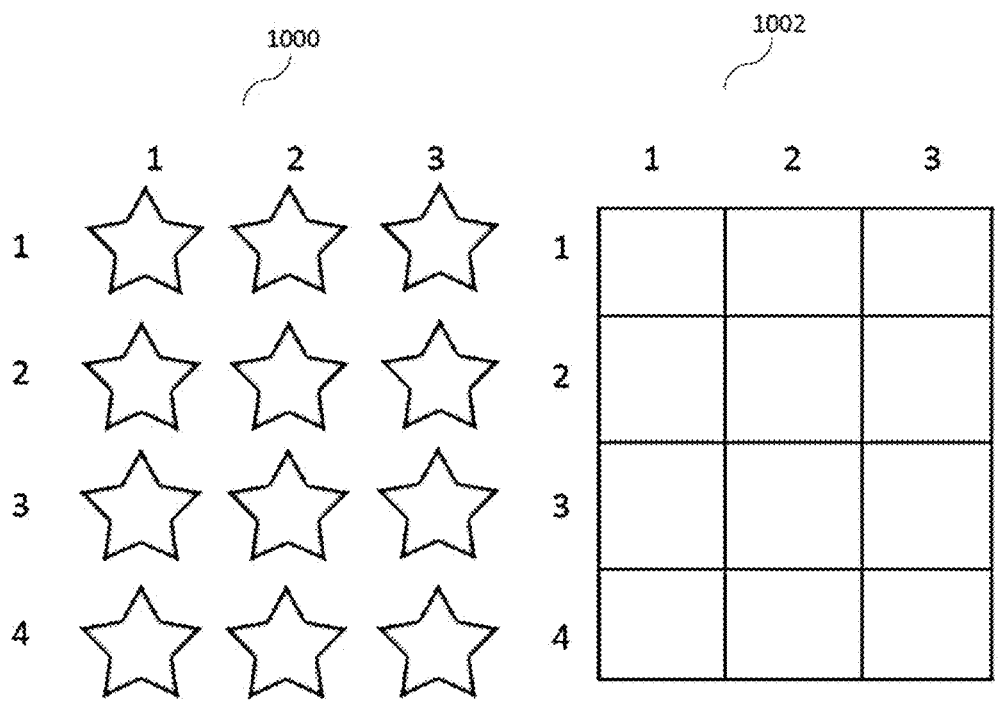
FIG. 10 shows an example of a game board and its associated storage texture.

An example of a game board 1000 and its associated storage texture 1002 is schematically shown in FIG. 10. In this example, the illumination state of a single game object may be stored in a single pixel of the texture. The associated storage texture is a texture in which the illumination value of one or more game objects is stored.

The illumination information may be encoded into a texture by systematically iterating through the illuminable objects and writing raw bits into a pixel corresponding to the illumination state of the game object on the game board. To decode the information stored in the texture, each pixel is read in the fragment shader. In some embodiments, mathematical operations such as modulo, division or bit-shifting are used in order to unpack the illumination state data.

Alternatively, the illumination state of a single game object may be represented by a plurality bits in a single pixel. The total number of bits that may be stored in each pixel of the texture is defined by the bit depth of the texture. The bit depth of every pixel in the texture may be the same. The bit depth of the texture may be 1 bit, 2 or more bits, 8 or more bits, 32 or more bits, or 64 or more bits.

Alternatively, each pixel of the texture may allow the storage of a plurality of bits of information, enabling the illumination state of a plurality of game objects to be stored in a single pixel. For example, a texture typically comprises of RGB pixels each having three separate color channels: red, green, and blue. In one modification, instead of storing color information, these pixels may instead be used for the storage of the illumination value of a respective game object in what should be a color channel. That is to say that the pixel may store the illumination value of a first game object in what should be a red channel, the illumination value of a second game object in the what should be a green channel, and the illumination value of a third game object in what should be a blue channel. Although this embodiment is described with respect to storing the illumination values of a plurality of game objects in an RGB pixel, it will be understood that the embodiment is not limited as such. The pixel may comprise a plurality of channels to represent any color space. The color space may be, for example: cyan, magenta, yellow, key (CMYK); red, green, blue (RGB); hue, saturation, lightness (HSL); or luminance, blue-difference chroma, red-difference chroma (YUV).

Figure 11:
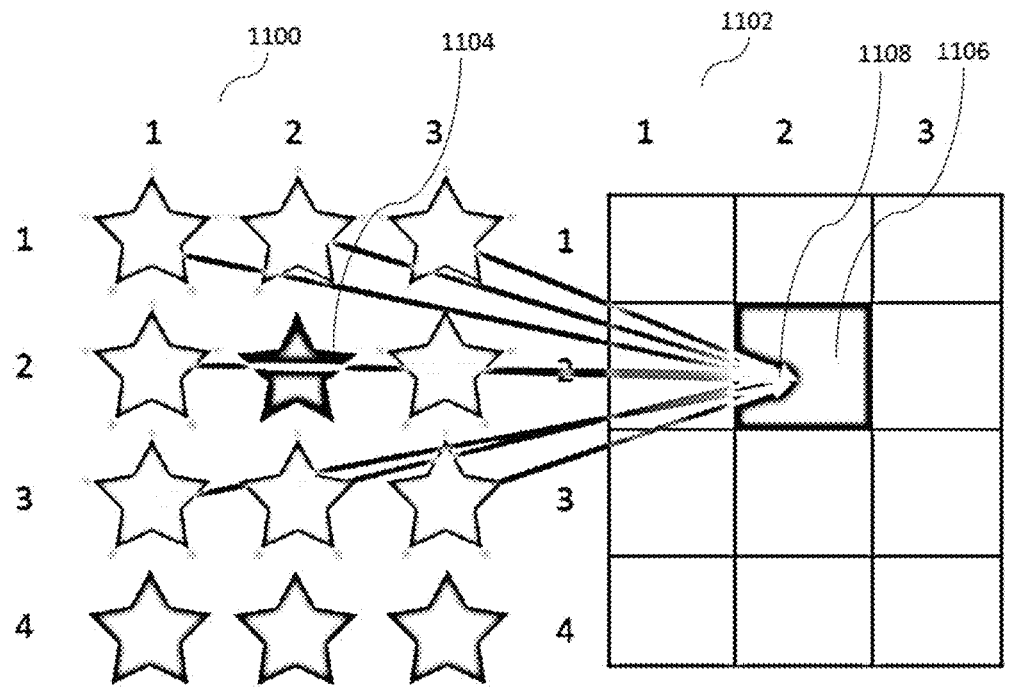
FIG. 11 shows schematically the storage, in a texture, of the co-ordinates of a game object on the game board.

FIG. 11 shows a storage texture 1102 that may be used to store the co-ordinates and the illumination state of each game object on the game board 1100. It is clear from FIG. 11 that the number of rows and the number of columns of the game board 1100, match the number of rows and the number of columns on the grid of the associated storage texture 1102. That is to say the resolution of the storage texture corresponds to the game objects on the game board. For example, to store the illumination effects of twelve game objects 1104 arranged in a game board 1100 comprising game objects 1104 arranged in a 3×4 grid, the illumination state of each game object 1104 may be stored in the corresponding pixel 1106 of a twelve pixel texture 1102 with pixels arranged in a 3×4 grid. For example, the illumination state of a game object 1104 in row 2, column 2 of the game board would be stored in the corresponding pixel of the texture, pixel 1106 which is located in row 2, column 2, as shown in FIG. 11. This storage method may enable the coordinates of some pixel read requests to be anticipated. Data to be read into a shader from the texture, such as coordinate data or an illumination value, can be anticipated as the shader knows which pixels are directly adjacent to the pixel to be updated and hence, the relevant data may be pre-fetched into the shader to reduce the real time demand on the mobile device.

The information stored in each pixel of the texture may be representative of the surrounding illuminable game objects. By way of example, FIG. 11 shows with directional arrows 1108 that the value stored in the pixel 1106 in the location 2, 2 may be a combination of the illumination values of game objects from surrounding game objects. In this example, the information stored in the pixel 1106 is a combination of the illuminable objects directly adjacent to the game object to be stored. That is to say, that the value stored in pixel 2,2 of the texture may be comprised of a combination of the values stored in the locations: 1,1; 1,2; 1,3; 2,3; 3,3; 3,2; 3,1; and 2,1. The combination of values may be achieved using simple addition. Alternatively, the combination of values may represent any mathematical operation or combination of mathematical operations, such as, addition, subtraction, multiplication, or division.

Figure 12:
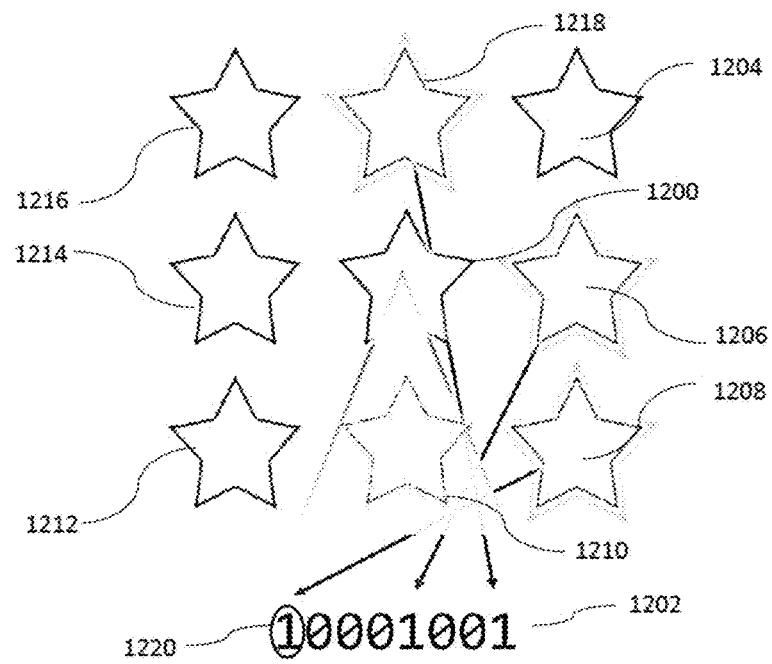
FIG. 12 shows schematically, the storing of game board data, in which a game object is represented by a bit field.

FIG. 12 shows an alternative method of storing game board data for a part of a game board. A game object 1200 may be represented by a bit field 1202. For example, each bit 1220 of the bit field 1202 may represent a single game object 1204. In FIG. 12, storing game object 1200 would require an 8-bit field as there are 8 game objects directly adjacent to game object 1200. The bits may be stored in a predetermined order, wherein the position of the bit 1220 in the bit field 1202 corresponds directly to the location of a game object 1204, 1206, 1208, 1210, 1212, 1214, 1216, 1218 on the game board, relative to the game object being stored 1200. For example, the first bit 1220 of the bit field may always store the illumination value of a first game object 1208. More specifically, the bit field 1202 representing game object 1200 may store the illumination state of each game object directly adjacent to game object 1200 in the following order, from the first bit 1220: bottom right 1208, bottom left 1212, top right 1204, top left 1216, right 1206, left 1214, bottom 1210, and top 1218. This order is by way of example only and different orders may be used in different embodiments.

The bit field 1202 may be any length. The length of the bit field may correspond with the number of game objects directly adjacent to the game objects to be stored. The bit field may be at least 8 bits long. An 8-bit long field allows binary on/off illumination information to be stored for each of the game objects directly adjacent 1204, 1206, 1208, 1210, 1212, 1214, 1216, 1218 to the game object to be stored 1200. A binary 1 may indicate that a game object is illuminated. A binary 0 may indicate that a game object is not illuminated. Additional data may be used in conjunction with this bit field, for example, intensity or color information. Alternatively or additionally, any additional data required may be hard coded into the shader.

Figure 13:
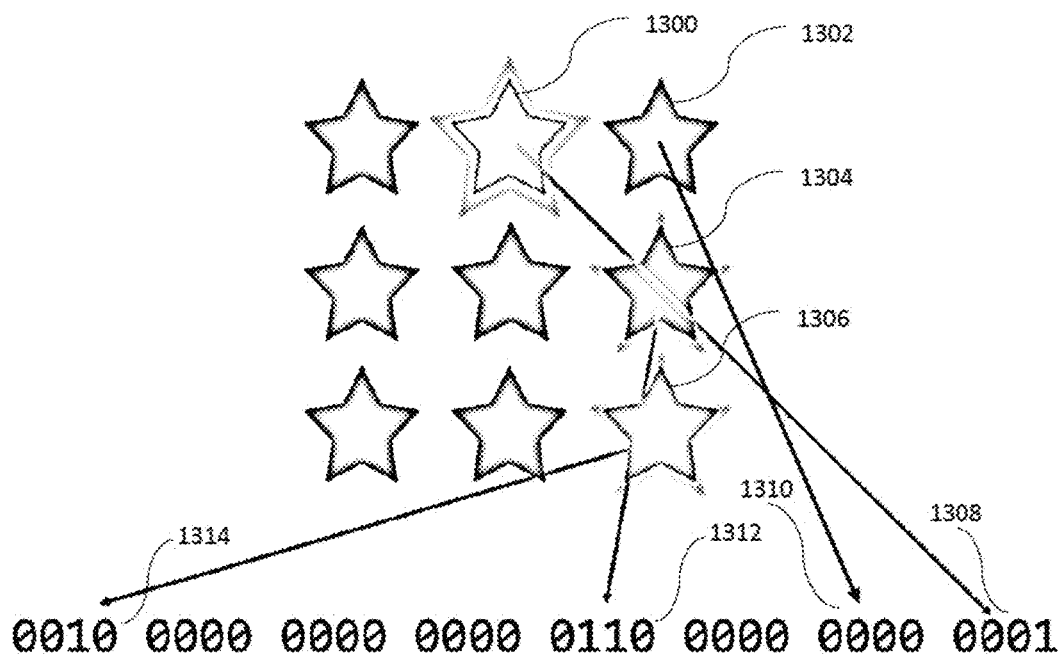
FIG. 13 shows schematically, another example of the storing of game board data.

FIG. 13 shows a bit field of 32 bits, such that 4 bits correspond to each game object. Using multiple bits per game object enables multiple illumination states to be stored per game object. A bit field of 32 or more bits allows at least 4 bits to be used per game object. 4 bits per game object allows 16 states to be stored. The stored states may comprise 16 illumination states. Alternatively, the stored states may comprise a number of illumination states and additional states, such as color states. The game objects may have any level of illumination. For example, game objects 1300, 1302,604, and 1306 are all shown to have different illumination states with differing bit values 1308, 1310, 1312, and 1314. Alternatively, a bit field of 16 or more bits may be provided, with 2 bits available for each of the game objects directly adjacent 1204, 1206, 1208, 1210, 1212, 1214, 1216, 1218 to the game object to be stored 1200. A 16 or more bit field allows a plurality of illumination levels to be stored. It is apparent that a bit field of 32 or more bits may be provided in other embodiments.

Figure 14:
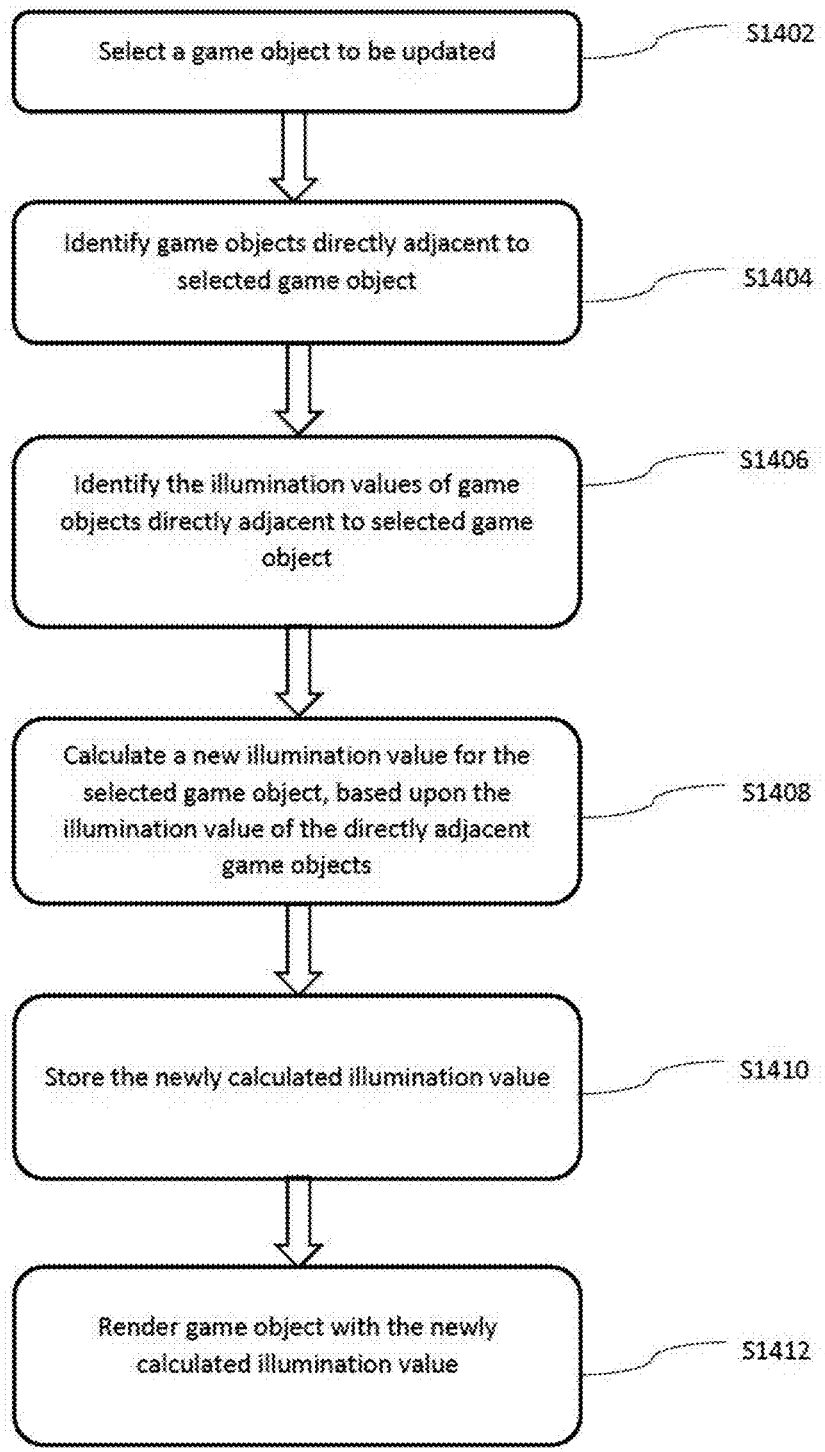
FIG. 14 shows a flow chart of a method according to an embodiment.

A flow chart of a method according to an embodiment is shown in FIG. 14.

At step S1402, the game object to be updated is selected. The game object may be selected based upon: a computer algorithm, a set of game rules, and/or in response to a user input. In some embodiments, each game object of the game board is selected. For example, each game object may be selected in turn.

The game objects directly adjacent to the selected game object are identified in step S1404. Identification of directly adjacent game objects may be achieved by storing the information in specific locations of a bit field or texture. In other embodiments, different techniques may be used to determine the adjacent game objects.

Once the directly adjacent game objects have been identified, the illumination values of the directly adjacent game objects are determined in step S1406 by decoding the texture or bit stream. In other embodiments, different techniques may be used for obtaining or determining the illumination value.

A new illumination value is calculated or otherwise determined for the selected game object in step S1408, which is based upon the illumination values of game objects directly adjacent to the selected game object. The determination may be a simple culmination of illumination values in the directly adjacent game objects or, it may be based on a more sophisticated mathematical equation. A more sophisticated mathematical equation may, for example, attribute a larger impact to game objects located horizontally or vertically adjacent to the selected game object and a smaller impact to a game object located diagonally adjacent.

Once the new illumination value has been calculated or otherwise determined, it is stored in memory, in step S1410. The value may be, for example, stored in a bit stream or as a texture.

Finally, in step S1412, the game object is rendered with the newly calculated illumination value.

In some embodiments, if there is a failure to render the game objects in real time at a desired frame rate or in response to another condition or trigger, pre-calculated game objects may be rendered in a layer over the real time objects, to increase the frame rate.

Figure 15:
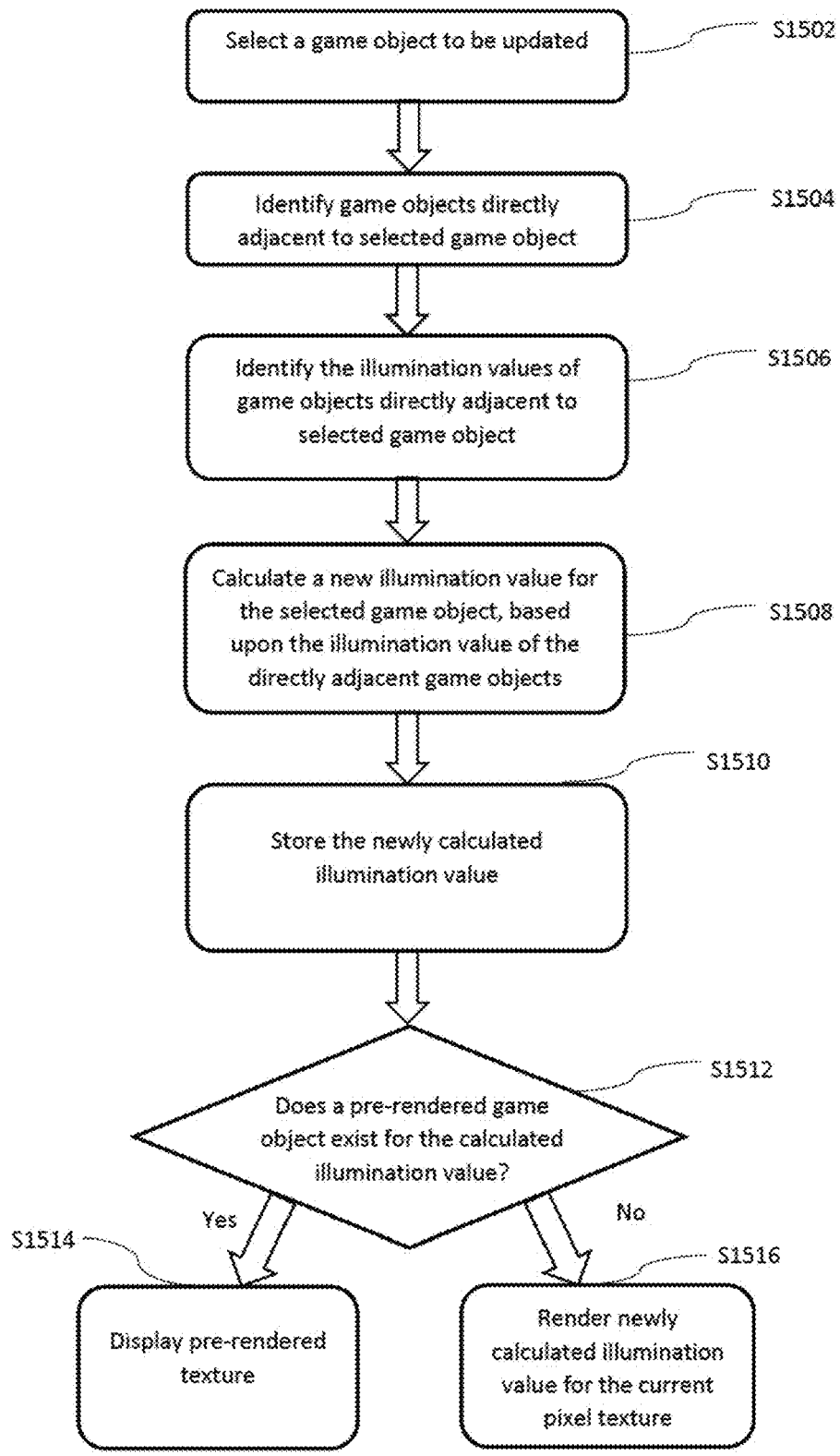
FIG. 15 shows a flow chart of another method according to an embodiment.

A flow chart of another method according to an embodiment is shown in FIG. 15. This embodiment may be have application for relatively slow graphics processing units but may alternatively or additionally be used.

Steps S1502, S1504, S1506, S1508, and S1510 respectively correspond to steps S1402, S1404, S1406, S1408, and S1410 of FIG. 14.

Once the new illumination value has been calculated or otherwise determined for the game object, the value is compared, in step S1512, with a set of known values. Each known value has an associated pre-rendered game object. If the value is known, the appropriate pre-rendered game object is displayed in step S1514. If the value is not known, the game object is rendered with the newly calculated illumination value.

It should be appreciated that in some embodiments, the rendering may be performed by at least one processor on which a computer program is running or executing. In some embodiments, a hardware renderer may be provided to perform the rendering.

Various methods and devices have been described. It should be appreciated that these methods may be implemented in apparatus or devices comprising any suitable circuitry. Some embodiments may be implemented by at least one memory and at least one processor. The memory is provided by memory circuitry and the processor is provided by processor circuitry.

Some embodiments may be provided by a computer program running on the at least one processor. The computer program may comprise computer implemented instructions which are stored in the at least one memory and which may be run on the at least one processor. A computer program product may be provided which comprises computer program product comprising code embodied on a computer-readable medium which is configured to be executed on a processor of the computer or user device. In some embodiments, a non-transitory computer readable storage device may be provided to store program code instructions that, when executed by at least one processor causes any of the above described methods to be performed.

The invention claimed is:

1. A computer implemented method, said method comprising the following steps performed by one or more processors:
    selecting a game object in an image which is displayed on a display, said image comprising a plurality of game objects, a subset of which game objects are adjacent to said selected game object, each game object having a respective illumination value;
    determining for the selected game object an updated illumination value, using the respective illumination values of the game objects of the subset, wherein the subset comprises some but not all other game objects to be displayed in the image; and
    displaying on the display the selected game object having the determined updated illumination value.

2. The method as claimed in claim 1, wherein the selected game object and at least some of the other game objects in the image are arranged in a grid like arrangement.

3. The method as claimed in claim 1, wherein the subset comprises only directly adjacent game objects to the selected object.

4. The method as claimed in claim 3, wherein the method comprises determining which of the other game objects are directly adjacent to the selected object.

5. The method as claimed in claim 1, further comprising:
    storing in a memory, the updated illumination value for the selected game object.

6. The method as claimed in claim 3, comprising reading from a memory illumination values of the directly adjacent game objects.

7. The method as claimed in claim 1, comprising storing in a memory illumination values of a plurality of the game objects of the image as a texture.

8. The method as claimed in claim 7, wherein an illumination value of a respective game object is stored as a pixel in the texture, and a location of the pixel in the texture is dependent on a location of the respective game object in the image.

9. The method as claimed in claim 7, wherein illumination values of a plurality of game objects are stored in a single texture.

10. The method as claimed in claim 7, wherein illumination values of a plurality of game objects are stored in a single pixel, each game object being stored in a color channel.

11. The method as claimed in claim 1, comprising storing the illumination value of a respective game object in a bit field, wherein each bit in the bit field corresponds to a respective game object.

12. The method as claimed in claim 11, wherein the position of a corresponding bit in the bit field corresponds to a predetermined location of the respective game object in the image.

13. The method as claimed in claim 1, comprising storing an illumination value of a respective game object in a bit field, wherein each game object is associated with a plurality of bits in the bit field.

14. The method as claimed in claim 1, comprising using at least one pre-rendered texture stored in a memory to display one or more game objects respectively associated with at least one pre-rendered texture.

15. The method as claimed in claim 14, comprising displaying a respective pre-rendered texture if an illumination value of a respective game object corresponds to illumination values associated with the pre-rendered texture.

16. A computer implemented device comprising a display and at least one processor configured to:
    select a game object in a graphical image which is displayed on a display, said image comprising a plurality of game objects, a subset of which game objects are adjacent to said selected game object, each game object having a respective illumination value;
    determine for the selected game object an updated illumination value, using the respective illumination value of the game objects of the subset, wherein the subset comprises some but not all other game objects to be displayed in the image; and displaying on the display the selected game object having the determined updated illumination value.

17. The computer implemented device according to claim 16, wherein the subset comprises only directly adjacent objects to the selected game object.

18. The computer implemented device according to claim 16, comprising a memory configured to store illumination values of a plurality of the game objects of the image as a texture.

19. A non-transitory computer readable storage device for storing instructions that, when executed by at least one processor, causes said at least one processor to:
   select a game object in an image which is displayed on a display, said image comprising a plurality of game objects, a subset of which game objects are adjacent to said selected game object, each game object having a respective illumination value;
   determine for the selected game object an updated illumination value, using the respective illumination values of the game objects of the subset, wherein the subset comprises some but not all other game objects to be displayed in the image; and
   displaying on the display the selected game object having the determined updated illumination value.

* * * * *